United States Patent [19]

Kitahara

[11] Patent Number: 4,839,546

[45] Date of Patent: Jun. 13, 1989

[54] ROTATIONAL NOISE REDUCTION STRUCTURE IN DC MOTOR WITH ROTOR MAGNETS

[75] Inventor: Haruo Kitahara, Iijima, Japan

[73] Assignee: Shinano Tokki Corporation, Tokyo, Japan

[21] Appl. No.: 106,623

[22] Filed: Oct. 6, 1987

[30] Foreign Application Priority Data

Mar. 2, 1987 [JP]  Japan ................................. 62-45294

[51] Int. Cl.$^4$ .............................................. H02K 5/24
[52] U.S. Cl. .................... 310/51; 310/67 R; 310/156
[58] Field of Search .............. 310/51, 67 R, 68 R, 310/68 B, 156

[56] References Cited

U.S. PATENT DOCUMENTS 3,329,845  7/1967  Lear .................................. 310/67 R
4,115,715  9/1978  Müller .............................. 310/67 R Primary Examiner—Patrick R. Salce
Assistant Examiner—D. L. Rebsch
Attorney, Agent, or Firm—Welsh & Katz, Ltd.

[57] ABSTRACT

A method and apparatus for reducing the rotational noise in dc motors with rotor magnets, comprising forming the rotor magnet so that its magnetic center plane is aligned with the geometric center plane of the stator core, thereby providing for a distribution of the air gap magnetic flux density about the magnetic center plane in an asymmetric manner and reducing the rotational noise of the motor without the need to reduce the axial dimensions of the magnet.

6 Claims, 3 Drawing Sheets

ROTATIONAL NOISE REDUCTION STRUCTURE IN DC MOTOR WITH ROTOR MAGNETS

BACKGROUND OF INVENTION

This invention relates to dc motors and more particularly dc motors with magnet rotors having reduced rotational noise.

FIG. 5 shows in a half-sectioned view a conventional magnet rotor type brushless dc motor having a magnet rotor, including a fixed aluminum frame 1 having a cylindrical center boss portion 2 and a stator core 3 fixed by a friction or press-on fit on the circumference of the center boss portion 2. A cup-shaped steel rotor frame 6 is fixed by a friction or press-on fit on a rotational shaft 5 journalled in the boss portion 2 through bearings 4. A rotor magnet 8 is fixed on the inner side of the rotor frame 6 in face-to-face relation with the stator core 3 through an air gap 7.

With the above-described structure, the electromagnetic attractive force between the torque generating core 3 and the magnet 8 varies with the rotational position of the magnet 8. Therefore, in order to minimize the vibrations resulting from such variations, one generally aligns the axial center planes X and X'. However, this procedure is sometimes made difficult by the presence of a Hall element 9, which detects the position of the rotor magnet 8, or by the presence of a speed sensor element 10. In such cases, rotational noise of the motor can be produced by axial vibrations due to the variable electromagnetic attractive force generated therein.

SUMMARY OF INVENTION

The object of the present invention is a dc motor with a magnet rotor having reduced rotational noise.

In accordance with the present invention, and in furtherance of the foregoing object of the invention, there is provided a dc motor with a magnet rotor having reduced rotational noise. The geometric center plane of the stator core of the motor is in a median position and positioned along the rotational axis of the motor. The magnetic center plane of the rotor magnet is positioned in the rotor magnet so that it is aligned with the geometric center plane of the stator core when the rotor magnet is secured in an operative position on the motor. With this structure, the motor exhibits an air gap magnetic flux density distribution which is symmetrically located about the magnetic center plane of the rotor magnet.

By forming the magnetic center plane of the rotor magnet so that it is aligned with the geometric center plane of the stator core, the components of the magnetic attractive force in the direction of the rotational axis are reduced, and therefore the vibrations due to these forces are suppressed.

DETAILED DESCRIPTION OF ONE EMBODIMENT OF THE INVENTION

Figure 1:
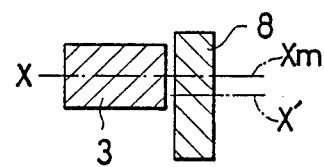
FIG. 1 is a fragmentary sectional view of a schematic showing a dc motor having a magnet rotor incorporating the preferred embodiment of the present invention.

In the schematic of the invention shown in FIG. 1, the magnetic center plane Xm of a rotor magnet 8 is shown in a median operative position with its magnetic axis aligned with the geometric center plane X of the stator core 3. As seen in FIG. 1, the magnetic center plane Xm is not located at the geometric center of the rotor magnet 8, but it is asymmetrically located. As can be seen in FIG. 1, the magnetic center plane $X_m$ of the rotor magnet is spaced from the geometric center plane X'. The magnetic center plane Xm of the rotor magnet is the plane on which the maximum value of air gap magnetic flux density distribution is located. Thus, when the axis of the magnetic center plane Xm of the rotor magnet 8 is aligned with the axis of the geometric center plane X of the core 3, the air gap magnetic flux density in the axial direction is distributed asymmetrically relative to the plane Xm, and the maximum area of the electromagnetic attractive force between the magnet 8 and core 3 is attracted toward Xm rather than toward the geometric center plane X' of the magnet 8. As a result, the components of electromagnetic attractive force are reduced in the direction of the rotational axis, and rotational noise is suppressed.

Figure 2:
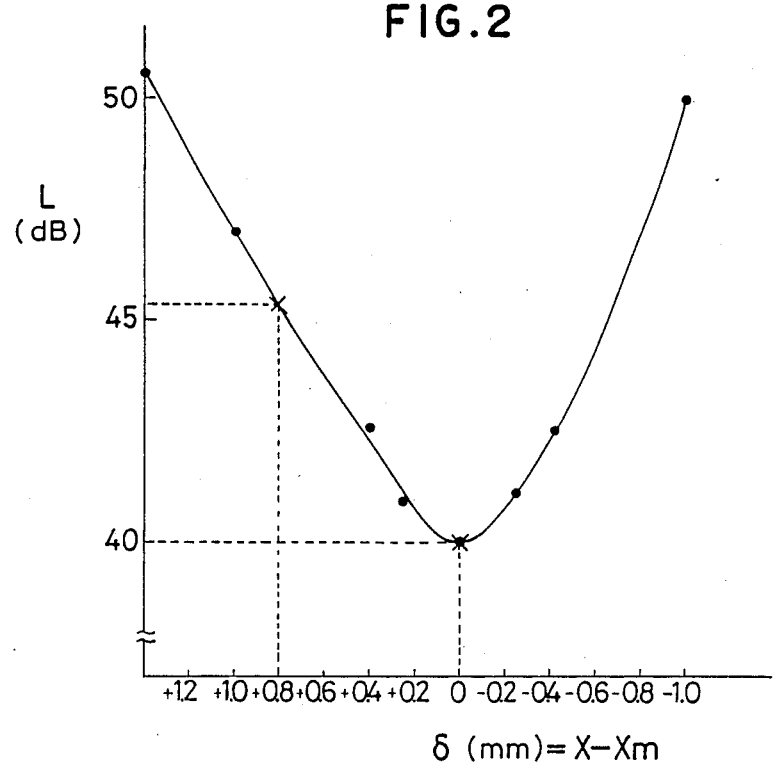
FIG. 2 is a graph showing the deviation ($\delta$) of the magnetic center plane of the rotor magnet from the center plane of the stator core of a dc motor having a magnet rotor in relation to the level of rotational noise (L)

Plotted in FIG. 2 are the deviational distances ($\delta$) between geometric center plane X of the stator core 3 and the magnetic center plane Xm of the rotor magnet 8 in relation to the rotational noise level (L). In this regard, it has been confirmed that the rotational noise level of 45.4 dB when $\delta = 0.8$ can be suppressed to 40 dB by holding $\delta = 0$ according to the invention of FIG. 1.

Figure 3:
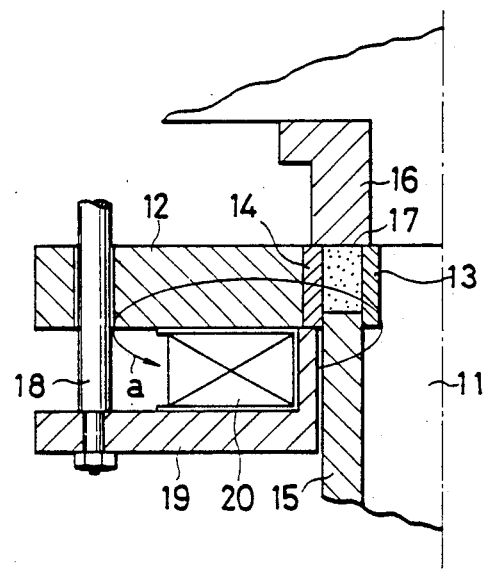
FIG. 3 is a vertical section of a portion of a magnet shaping press used in forming a rotor magnet according to the present invention.
Figure 4:
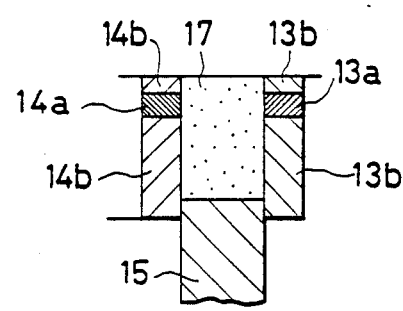
FIG. 4 is a sectional view showing on an enlarged scale a portion of the press of FIG. 3.
Figure 5:
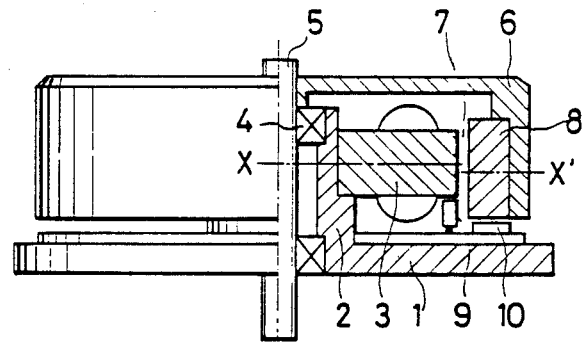
FIG. 5 is a half-sectioned view of a conventional magnet rotor type DC motor.

Shown in FIGS. 3 and 4 is a press for forming the magnet into a ring-like shape from magnetic powder and placing the magnetic center plane Xm of an outer rotor magnet 8 in a desired axial position. The forming press of FIGS. 3 and 4 includes a cylindrical steel block 11 and an annular steel block 12 which are concentrically fixed on a stationary block, not shown. The respective upper end faces are flush with each other, and a bushing 13 is fitted around the upper end of the cylindrical block 11 flush with the outer peripheral surface thereof. A bushing 14 is fitted in the center bore of the annular block 12 in face-to-face spaced relation with bushing 13. An annular lower punch 15 is fitted between the bushings 13 and 14 in intimate contact therewith and hydraulically driven so as to move vertically along the outer periphery of the cylindrical block 11. An upper punch 16 is in abutting engagement with the upper end faces of the bushings 13 and 14. Upper punch 16, lower punch 15, and bushings 13 and 14 define a die or mold. Magnetic powder 17 such as ferrite magnetic powder is charged into the die. The powder is then molded into the shape of the die by driving the lower punch 15 upwardly against the stationary upper punch 16.

A support ring 19 of steel is fixed to a lower portion of the annular block 12 and by a bolt 18. An exciting coil 20, wound on an insulating bobbin, is secured between the annular block 12 and the support ring 19.

When the powder 17 is molded as set forth above, coil 20 is energized, thereby magnetizing the powder 17 in the direction of the magnetic path a.

The intermediate portions 13a and 14a of bushings 13 and 14, corresponding to the magnetic center plane Xm, are formed of a steel material which has greater magnetic permeability than their upper and lower portions 13b and 14b. For example, the intermediate portions 13a and 14a of the bushings 13 and 14 are formed of an alloy tool steel SKD for hot dies (with a saturated magnetic flux density of 13,000-15,000 gauss), while forming the upper and lower portions 13b and 14b of an alloy tool steel SKS for impact resistant tools (with a saturated magnetic flux density of 8,000-10,000 gauss).

Accordingly, at the time of the energization of the coil 20, the magnetic powder 17 in contact with the intermediate portions 13a and 14a of the bushings is magnetized in the radial direction more strongly than the magnetic powder 17 which is in contact with other portions of the bushings, thereby forming a magnetic material which has variations in radial anisotropy in the axial direction. The magnetization of this annular magnetic material is then erased and magnetized again by a conventional magnetizing method to obtain a desired rotor magnet 8 with N and S magnetic poles on the inner periphery thereof.

It can be seen in FIG. 4 that the intermediate portions 13a and 14a, which have the greater magnetic permeability, are not located at the geometric center of the bushings 13 and 14, but they are asymmetrically located, since the upper portions 13b and 14b are substantially shorter than the lower portions 13b and 14b. Thus, the rotor magnet 8 of FIG. 1 which is finally produced from the compressed and magnetized powder 17 of FIG. 4 has a resulting magnetic center plane Xm which is asymmetrically located with respect to the geometric center plane of rotor magnet, as shown in FIG. 1.

Although the foregoing description has been directed to a motor with an outer rotor, it should be understood that the invention may be similarly applied to motors with an inner rotor.

By changing the distribution of the air gap magnetic flux density and thereby placing the magnetic center of the rotor magnet where necessary in the axial direction so as to align it with the geometric center plane of the stator core when the magnet rotor is in an operative position in the motor, the present invention suppresses the rotational noise of a dc rotor. Such suppression can be achieved without reducing the axial dimensions of the rotor magnet necessary for generating a specific torque. Additionally, the axial shift of the magnetic center can be adjusted by changing the dimensions and nature of the material to be used as a magnetic path. Therefore, the subject invention also facilitates the design of magnet rotor type dc motors of low rotational noise.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

What is claimed:

1. A magnet rotor type dc motor, said motor having a stator core and a rotor magnet, characterized in that the magnetic center plane of said rotor magnet, providing for a maximum value of the magnetic flux density, is spaced from the geometric center plane of the rotor magnet and is axially aligned with the geometric center plane of said stator core to attract said stator core toward the magnetic center plane of the rotor magnet instead of toward the geometric center plane of the rotor magnet, whereby rotational noise of the motor is suppressed.

2. The motor of claim 1, wherein the magnetic flux density is distributed asymmetrically about the geometric center plane of the stator core.

3. A magnet rotor type dc motor, said motor having a stator core and a rotor magnet, characterized in that the magnetic center plane of said rotor magnet is spaced from the geometric center plane of the rotor magnet and is axially aligned with the geometric center plane of said stator core for a maximum value of the magnetic flux density about the geometric center plane of the stator core, whereby rotational noise of the motor is suppressed.

4. A magnet rotor type dc motor, said motor having a stator core and a rotor magnet, characterized in that the magnetic center plane of said rotor magnet, providing for a maximum value of the magnetic flux density, is spaced from the geometric center plane of the rotor magnet and is axially aligned with the geometric center plane of said stator core, to attract the maximum area of the electromagnetic attractive force between said rotor magnet and said stator core toward the magnetic center plane of the rotor magnet instead of toward the geometric center plane of the rotor magnet, to reduce the components of electromagnetic attractive force in the direction of the rotational axis of the motor, whereby rotational noise of the motor is suppressed.

5. The motor of claim 4 wherein the magnetic center plane of said rotor magnet providing for a maximum value of the magnetic flux density is formed within said rotor magnet in a desired position spaced from the geometric center plane of said rotor magnet, so as to coincide with the geometric center plane of said stator core.

6. The motor of claim 4, wherein the magnetic flux density in the axial direction of said motor is distributed asymmetrically about the magnetic center plane of said rotor magnet.

* * * * *